(No Model.)
J. BURKE.
REGULATING ELECTRIC DISTRIBUTION SYSTEM.
No. 555,301. Patented Feb. 25, 1896.
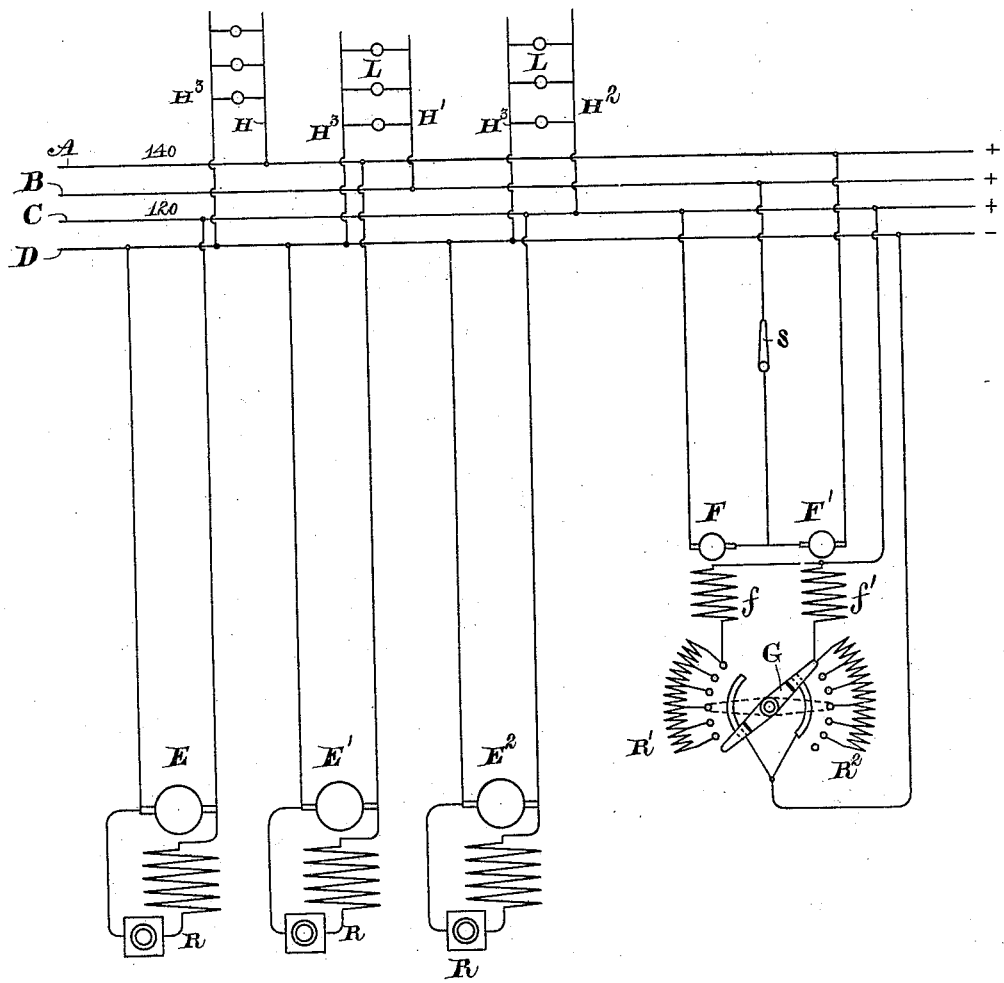
Witnesses-
A. F. Macdonald.
T. J. Johnston.
Inventor-
James Burke, by
Geo. R. Blodgett,
Atty.

UNITED STATES PATENT OFFICE.

JAMES BURKE, OF SCHENECTADY, NEW YORK, ASSIGNOR TO THE THOMSON-HOUSTON ELECTRIC COMPANY, OF BOSTON, MASSACHUSETTS.

REGULATING ELECTRIC DISTRIBUTION SYSTEM.

SPECIFICATION forming part of Letters Patent No. 555,301, dated February 25, 1896.

Application filed December 24, 1894. Serial No. 532,768. (No model.)

*To all whom it may concern:*

Be it known that I, JAMES BURKE, a subject of the Queen of Great Britain, residing at Schenectady, county of Schenectady, State of New York, have invented certain new and useful Improvements in Regulating Electric Distribution Systems, of which the following is a specification.

It is customary in electric lighting or other central stations, as at present equipped, to employ bus-bars which are maintained at different potentials by generators of different voltage, or other well-known means, and to lead from the higher-potential bus-bars feeders designed to furnish current to the outlying portions of the distribution system, or to those portions where for various reasons, well understood, the drop in potential is greatest, while the parts of the system nearer the station, or where the drop is less, are supplied from bus-bars of lower potential. In a station operated in the manner just described, it often becomes necessary to regulate the potential of certain of the feeders so that the voltage will be of an intermediate amount between the extremes normally maintained on the different bus-bars. This is recognized in central-station plants as a necessity in order to render the regulation flexible and to maintain the desired potential throughout the entire system.

Resistances and what are known as "boosting-machines" in the feeders are now used for regulating the potential of the feeders, as may be necessary.

The present invention comprises a novel method of regulation, which I have designed especially for use in such systems as have been pointed out, though the invention will be found useful in a wide variety of applications where it is necessary to regulate the potential in an electric circuit.

In order to explain the invention I will describe its application to a system of feeder-regulation where, as just mentioned, it is desirable to supply to some of the feeders current of a different potential from the normal values maintained at the bus-bars, though, as indicated in the claims, the invention may be used in other connections.

For illustration assume, as indicated in the drawing, a distribution system of a simple character, comprising bus-bars normally maintained at different standard potentials, say one hundred and forty and one hundred and twenty volts, respectively. In order to supply some of the feeders with current of an intermediate potential I provide an additional bus-bar, which is connected with those first mentioned through variable sources of electromotive force, acting, as explained hereinafter, to reduce the potential of the current from the bus-bar of higher potential and raise the potential of the current from the lower-potential bus-bar to any desired amount. The preferred arrangement consists of a pair of regulating or supplementary dynamo-electric machines, whose armatures are connected in series between the regular bus-bars and which are mounted on the same shaft or otherwise so geared as to rotate in unison. The intermediate bus-bar, on which the potential is to be regulated, is connected between the two armatures. The electromotive forces of the regulating-machines are then varied inversely, so that one machine will boost down and the other machine will boost up. In this manner a potential can be maintained on the intermediate bus-bar which is either equal to that of the normal potentials on either of the standard bus-bars or which has any intermediate value desired.

The accompanying drawing shows in diagram a distribution system embodying the invention.

In the drawing, A C represent two positive bus-bars, which are maintained at different potentials and supplied with current from the main generators E E' E², which are connected as shown.

D is the negative bus-bar, and B is the supplementary bus-bar on which the potential is varied, as will be described.

The main generators are shown as shunt-wound and provided with a resistance R in their field-circuits; but the construction of these generators is not in any sense a material part of the invention.

H H' H² represent feeders, of which there may be any desired number, connected, respectively, to the bus-bars A B C. The return-feeders H³ are shown connected to the negative bus D, and lamps or other translating devices L are shown connected in the different consumption-circuits.

I will assume for illustration that the bus-bar A is normally maintained at a higher potential than the bus-bar C, the former being at one hundred and forty volts and the latter at one hundred and twenty, though these values are merely selected for exemplifying the invention and are in no sense essential. A pair of regulating-dynamos have their armatures F F' connected in series between the bus-bars A C, so that under the conditions assumed there will normally be a difference of potential of twenty volts between the terminals of the two machines. The bus-bar B is connected to an intermediate point between the two armatures, and a switch s is shown for making and breaking this last circuit at will. The regulating-dynamos may have their fields excited in any suitable manner—as, for example, by connecting them in the manner indicated in multiple between the negative bus-bar D and one of the positive bus-bars. A pair of rheostats R R' are included, respectively, in the field-circuits of the two machines, and a switch-arm G is so arranged as to cut resistance out of the circuit of one machine simultaneously with introducing resistance in the circuit of the second machine.

The mode of operation of the invention will now be described. With the switch G in the position shown in full lines the field-circuit f is broken and this machine is running idle, while the field-strength of the second machine, and consequently the counter electromotive force developed thereby is a maximum. Hence the potential of the bus-bar B will be practically the same as that of the bar C, the machine F' running as a motor and absorbing the twenty volts difference of potential between the bus-bar A and the busses B or C. By throwing the switch-arm G to the right, as indicated in dotted lines, the potential upon bus-bar B will rise to substantially one hundred and thirty volts, or a rise of about one-half the normal difference between the bars A C, for the strength of the field of machine F' has now become weakened, so that its counter electromotive force is reduced and the difference of potential between its terminals is now substantially ten volts instead of twenty volts, as before. The machine F, on the other hand, which is driven as a generator, raises the potential of the current from bus-bar C a corresponding amount. By moving the switch-arm still farther to the right the potential of the bus-bar B will become nearer and nearer to that of the bus-bar A and farther and farther from that of the bar C, until in the final position the potential of the bus B may be brought up to substantially that of the bar A. In this manner the modifying effect of the electromotive forces in the armatures F F' upon the main generators, or the bus-bars with which the main generators are connected, is such that the potential upon the bar B may assume any desired value between the two standard potentials regularly maintained in the station.

The invention of course may be developed further, and is applicable to more extended systems of distribution than that herein shown, which will be understood by electrical engineers from what is herein set forth.

Having described my invention, what I claim as new, and desire to secure by Letters Patent, is—

1. The method of regulating the potential in an electric circuit, which consists in supplying the circuit with current from main sources of supply of different potential, and regulating the potential of the supplied current by intermediate variable sources of electromotive force which act inversely upon the main sources of supply to reduce the potential of the one and raise the potential of the other.

2. The method of regulating the potential of a bus-bar, feeder or other electric circuit, which consists in connecting the bus-bar to main sources of current-supply of different potential through intermediate variable sources of electromotive force, which respectively tend to raise the potential of the main source of lower potential and reduce the main source of higher potential, and regulating inversely the values of such electromotive forces, as described.

3. The method of regulating the potential of a feeder or feeders in a system of electrical distribution, which consists in introducing between the feeder and two more sources of current of different electromotive force variable co-operating sources of electromotive force adapted, the one to increase the potential of the current from one of the main sources of electromotive force, and the other to decrease the potential from the other source, and adjusting such variable electromotive forces, to produce in the current delivered to the feeder the potential desired, as set forth herein.

4. The herein-described means for regulating the potential in an electric circuit, comprising a plurality of sources of current of different electromotive force, two dynamo-electric machines revolving in unison and having their armatures connected in series between said sources of current of different potential, the regulated circuit being connected between the said armatures, and means for regulating inversely the counter electromotive forces developed by the two machines, as described.

5. The combination of a plurality of sources of current of different electromotive force, a feeder or circuit main supplied with current at a potential intermediate between that of any two of such sources of current, electro-dynamic machines having variable fields and armatures connected in series between the two sources of current, and having the feeder or feeders connected between the two armatures, and means for rotating the armatures in unison, as described.

6. The herein-described means for regulating the potential in an electric circuit, consisting of a pair of dynamo-electric machines arranged to run in unison and connected in series across a supply source and with the regulated circuit connected between the armatures of the said machines, and means for simultaneously regulating inversely the electromotive forces developed in said armatures, as set forth.

7. The herein-described means for regulating the potential in an electric circuit, consisting of a number of dynamo-machines connected in series across a supply source, and with the regulated circuit connected between the armatures of said machines, and means for simultaneously increasing the electromotive force of one machine and decreasing the electromotive force in a second machine, as set forth.

In witness whereof I have hereunto set my hand this 22d day of December, 1894.

JAMES BURKE.

Witnesses:
B. B. HULL,
GENEVIEVE HAYNES.